Figure 1:
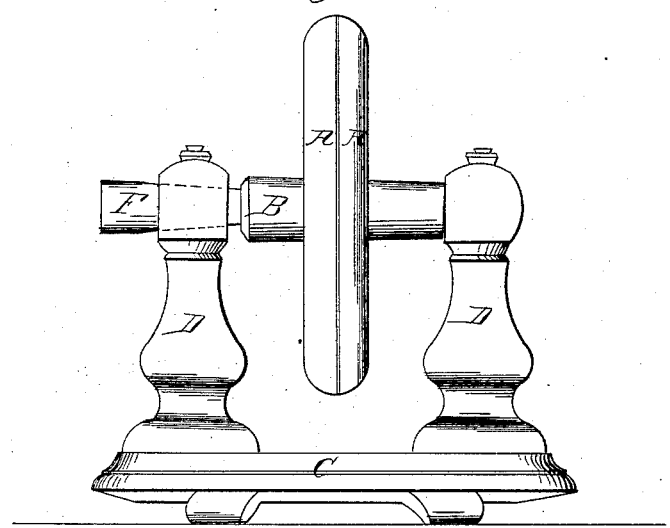

T. T. Prosser,
Rotary Steam Engine.

N° 23,311.          Patented Mar. 22, 1859.

Witnesses
Wm. S. N. Smallwood
H. S. Moulden

Inventor
Treb T. Prosser

UNITED STATES PATENT OFFICE.

TREAT T. PROSSER, OF FOND DU LAC, WISCONSIN.

ROTARY ENGINE.

Specification of Letters Patent No. 23,311, dated March 22, 1859.

*To all whom it may concern:*

Be it known that I, TREAT T. PROSSER, of the city and county of Fond du Lac and State of Wisconsin, have invented a new and useful Machine for Using Steam or other Elastic Fluids to Propel Machinery; and I do hereby declare that the following is a full and exact description.

The nature of my invention consists in constructing a spiral passage from the center or inside of a wheel to the periphery or outside in such a manner that a current or force in passing from the center to the circumference in said spiral passage will communicate its force to the wheel and cause it to revolve until it escapes thereby furnishing a cheap durable and desirable machine.

To enable others skilled in the art to make and use my invention I will proceed to describe its construction and operation as shown in the drawings accompanying this specification and forming a part thereof.

Figure 2:
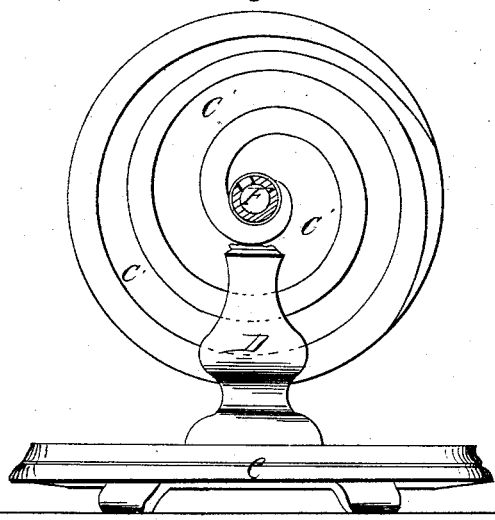

Figure 1 represents an outside view and Fig. 2 an inside view.

For convenience I construct my machine or engine in one piece, or in two halves as represented Fig. 1 A A, place it on a shaft Fig. 1 B, which is supported by two pillars Fig. 1 D D standing on the base. The shaft B Fig. 1 is hollow in one end, and allows the pipe F Fig. 1 to enter at one end, the other end of the pipe being in connection with the fluid it is thereby conveyed to the engine as desired. The shaft may be placed vertical horizontal or inclined consequently changing thereby the position of the wheel. The engine also may be placed on the extreme end of a shaft and thereby not requiring the shaft to be hollow but simply the connection of the pipe to the engine in such a manner as to convey the elastic fluids into it.

Fig. 2 C represents the internal passage way from the center to the circumference. It is in a spiral form and diminishing in size as it approaches the circumference of the wheel, the object of which is to give an increase of current to supply the decrease in velocity as near as may be. The outside of the passageway should be made smooth and regular to avoid friction. If made in two halves, as represented Fig. 1 A A, they should be perfectly fitted together with packing or otherwise to prevent wastage and loss of power consequent on the passage of the fluid from one convolution to the other instead of following the spiral as desired.

In Fig. 2 F represents the passage in the shaft B that connects with the spiral passage C in the wheel.

What I claim as my invention and desire to secure by Letters Patent is—

A wheel with a spiral passage diminishing in size from the center to the periphery in the manner and for the purpose substantially as described.

TREAT T. PROSSER.

Signed in presence of—
GILBERT L. GIBERSON,
WM. MARTIN.